US010480722B2

(12) United States Patent
Frye et al.

(10) Patent No.: US 10,480,722 B2
(45) Date of Patent: Nov. 19, 2019

(54) RETROFIT LAMP

(71) Applicant: OSRAM GmbH, Munich (DE)

(72) Inventors: Lambert Frye, Steinheim (DE); Klaus Eckert, Herbrechtingen (DE); Isabell Sklorz, Herbrechtingen (DE)

(73) Assignee: LEDVANCE GMBH, Garching bei München (DE)

( * ) Notice: Subject to any disclaimer, the term of this patent is extended or adjusted under 35 U.S.C. 154(b) by 0 days.

(21) Appl. No.: 15/451,762

(22) Filed: Mar. 7, 2017

(65) Prior Publication Data
US 2017/0254484 A1    Sep. 7, 2017

(30) Foreign Application Priority Data

Mar. 7, 2016   (DE) .................. 10 2016 203 668

(51) Int. Cl.
| F21K 9/237 | (2016.01) |
| F21V 29/70 | (2015.01) |
| F21K 9/238 | (2016.01) |
| F21K 9/232 | (2016.01) |
| F21V 19/00 | (2006.01) |
| F21K 9/90  | (2016.01) |
| F21K 9/69  | (2016.01) |

(Continued)

(52) U.S. Cl.
CPC .............. *F21K 9/237* (2016.08); *F21K 9/232* (2016.08); *F21K 9/238* (2016.08); *F21K 9/69* (2016.08); *F21K 9/90* (2013.01); *F21V 19/003* (2013.01); *F21V 19/004* (2013.01); *F21V 29/70* (2015.01); *F21K 9/235* (2016.08); *F21V 5/04* (2013.01); *F21V 17/16* (2013.01); *F21V 29/89* (2015.01); *F21Y 2105/10* (2016.08); *F21Y 2115/10* (2016.08); *Y02B 20/383* (2013.01)

(58) Field of Classification Search
CPC .......... F21K 9/237; F21K 9/232; F21K 9/238; F21V 29/70; F21V 19/003
See application file for complete search history.

(56) References Cited

U.S. PATENT DOCUMENTS

| 2006/0232974 | A1 | 10/2006 | Lee et al. |
| 2011/0090699 | A1* | 4/2011 | Shida ........................ F21V 3/02 362/294 |

(Continued)

FOREIGN PATENT DOCUMENTS

| DE | 102007050893 A1 | 4/2009 |
| DE | 102009043760 A1 | 3/2011 |
| DE | 102014205153 A1 | 9/2015 |

*Primary Examiner* — Jong-Suk (James) Lee
*Assistant Examiner* — Christopher E Dunay
(74) *Attorney, Agent, or Firm* — Hayes Soloway PC

(57) ABSTRACT

A retrofit lamp comprises a heat sink, a light source module with a circuit board, whose rear side lies two-dimensionally on the heat sink and at the front side of which at least one semiconductor light source is arranged, and a ring partially covering the front side of the light source module, wherein the ring presses the light source module onto the heat sink. A method serves for producing a retrofit lamp, wherein the rear side of the circuit board of the light source module is laid on the heat sink and the ring is put on the retrofit lamp from the front such that it presses the light source module onto the heat sink. The invention is particularly applicable to LED retrofit lamps for replacing conventional light bulbs or halogen lamps.

18 Claims, 6 Drawing Sheets

(51) Int. Cl.
    *F21V 29/89*    (2015.01)
    *F21K 9/235*    (2016.01)
    *F21V 5/04*     (2006.01)
    *F21V 17/16*    (2006.01)
    *F21Y 105/10*   (2016.01)
    *F21Y 115/10*   (2016.01)

(56) References Cited

U.S. PATENT DOCUMENTS

| | | | | |
|---|---|---|---|---|
| 2011/0292653 | A1* | 12/2011 | Hofmann | F21V 3/02 |
| | | | | 362/235 |
| 2012/0262932 | A1  | 10/2012 | Lu et al. | |
| 2013/0077318 | A1* | 3/2013  | Echigo | F21K 9/238 |
| | | | | 362/294 |
| 2013/0201700 | A1* | 8/2013  | Tamura | F21V 23/02 |
| | | | | 362/382 |
| 2014/0003044 | A1* | 1/2014  | Harbers | F21K 9/00 |
| | | | | 362/230 |
| 2014/0168981 | A1* | 6/2014  | Vanstiphout | F21V 19/003 |
| | | | | 362/249.02 |
| 2014/0286022 | A1* | 9/2014  | Kimiya | F21V 15/01 |
| | | | | 362/373 |
| 2014/0355241 | A1* | 12/2014 | Takenaka | F21V 3/12 |
| | | | | 362/84 |
| 2015/0176814 | A1* | 6/2015  | Hino | F21V 15/00 |
| | | | | 362/378 |
| 2016/0329624 | A1* | 11/2016 | Chen | F21K 9/232 |
| 2017/0142812 | A1* | 5/2017  | Creemers | H05B 37/0272 |
| 2017/0146199 | A1* | 5/2017  | Weng | F21K 9/237 |
| 2017/0184282 | A1* | 6/2017  | Chien | F21V 19/003 |
| 2017/0343163 | A1* | 11/2017 | Eckert | F21K 9/235 |

* cited by examiner

RETROFIT LAMP

The invention relates to a retrofit lamp comprising a heat sink and a light source module with a circuit board whose rear side lies two-dimensionally on the heat sink and at the front side of which at least one semiconductor light source is arranged. The invention is particularly applicable to LED retrofit lamps for replacing conventional light bulbs, halogen lamps etc.

LED retrofit lamps of that type are known where thermal conductive adhesives, thermal conductive foils or heat-conductive paste for generating an effective heat transfer from the light source module to the heat sink are provided between these two elements. The two elements are permanently pressed onto each other by means of a screw connection. Hereby it is disadvantageous that the screw connection causes high component and assembly costs and can furthermore reduce insulation sections.

The object of the present invention is to overcome the disadvantages of prior art at least partially.

This object is achieved according to the features of the independent claims. Preferred embodiments can particularly be learned from the dependent claims.

The object is achieved by a retrofit lamp comprising a heat sink, a light source module with a circuit board, whose rear side lies two-dimensionally on the heat sink and at the front side of which at least one semiconductor light source is arranged, and a ring pressing the light source module onto the heat sink. The ring can cover the front side of the light source module partially (in particular at the edge). The ring can laterally surround the light source module.

This retrofit lamp comprises very low component and assembly costs. Very long insulation sections can also be obtained. Furthermore, an ESD compatibility (i.e. a compatibility with an electrostatic discharge) can be improved. Additionally, the ring can easily exert a defined pressing force on the light source module, in particular on its circuit board.

The retrofit lamp can also be designated as a replacement lamp, e.g. for replacing conventional light bulbs, halogen lamps etc. Therefore, it can have at least one corresponding base (e.g. screw base, bipin base or bayonet base) and typically also comprises the form factor of the lamp to be replaced at least approximately. The retrofit lamp may, for example, comprise exactly one base which is located e.g. at a rearward end of the retrofit lamp. The retrofit lamp may be configured axially-symmetric with respect to a longitudinal axis, which longitudinal axis points from back to forth, for example.

The heat sink can be a heat spreading body and/or a cooling element. Advantageously, it consists of metal, e.g. of aluminum. The heat sink can be a cover or a lid of a driver housing. The heat sink may be formed like a cup or bowl, wherein the open side faces in a rearward direction of the retrofit lamp. The surface of the heat sink provided for supporting the light source module may be flat. It may be oriented forward.

In an embodiment the retrofit lamp has a driver provided to be supplied with electrical energy through the at least one base (e.g. through a connection with a socket connected with an electrical supply system) and to transform this electrical energy in electrical signals for operating the at least one semiconductor light source. For this purpose, the driver is electrically connected to the light source module. The driver can be accommodated in the driver housing or in a driver cavity.

In an embodiment the light source module can comprise only at least one semiconductor light source (and no other electrical or electronic element) besides the circuit board or printed circuit board. Alternatively, the circuit board can also comprise at least one electrical or electronic element (e.g. at least one ohmic resistance) and can in particular be designated as a light machine or "light engine" in this case. At its front side the circuit board can be equipped with the at least one semiconductor light source. At its rear side it can be equipped or be not equipped—for an especially simple flat contact on the heat sink.

If the base is located at a rearward end of the lamp, the semiconductor light sources can in particular emit their light into a front half-space.

In a further embodiment the retrofit lamp comprises at least one optical element arranged optically downstream of the light source module. The at least one optical element can arch over the light source module or at least its semiconductor light sources. The at least one optical element can comprise or be a translucent beam shaping element, e.g. a lens. The at least one optical element can be configured for distributing the light emitted by the at least one semiconductor light source with altered direction into the space. Thus, by the at least one optical element light can for example be deflected into a rearward half-space and/or its spatial distribution can be adapted closer to a spatial light distribution of the lamp to be replaced.

In still another embodiment the retrofit lamp has a translucent bulb arching in particular over at least the light source module and the ring. If present, the bulb can also arch over the at least one optical element. The bulb can be transparent or diffusely scattering. The bulb can, for example, consist of glass or plastics.

In a further embodiment the at least one semiconductor light source includes or has at least one light-emitting diode. If several light-emitting diodes are present, these can emit light in the same color or in different colors. A color can be monochrome (e.g. red, green, blue, etc.) or multichrome (e.g. white). The light emitted by the at least one light-emitting diode can also be an infrared light (IR-LED) or an ultraviolet light (UV-LED). Several light-emitting diodes can produce a mixed light; e.g. a white mixed light. The at least one light-emitting diode can contain at least one wavelength-transforming luminescent material (conversion LED). The luminescent material can alternatively or additionally be arranged remote from the light-emitting diode ("remote phosphor"). The at least one light-emitting diode can be provided in form of at least one, individually housed light-emitting diode or in form of at least one LED chip. Several LED chips can be mounted on a common substrate ("submount"). The at least one light-emitting diode can be equipped with at least one inherent and/or common optics for beam guidance, e.g. at least one Fresnel lens, collimator and so on. Instead of or additionally to inorganic light-emitting diodes, e.g. based on InGaN or AlInGaP, organic LEDs (OLEDs, e.g. polymer OLEDs) are also usable in general. Alternatively, the at least one semiconductor light source can comprise e.g. at least one diode laser.

The ring can cover the front side of the light source module at the edge. In particular, this can mean that the ring leaves free the at least one semiconductor light source or does not cover it. For this purpose, it is advantageous if the at least one semiconductor light source is arranged at a central region on the circuit board and comprises an edge region without a semiconductor light source and in particular advantageously without any elements.

Particularly, the ring can press onto the edge region of the circuit board and thus press the circuit board onto the heat sink. Thereby, the pressing force can exactly be pre-adjusted or preset.

The ring can also be designated as an intermediate ring, holding ring, clamping ring or tension ring. It can be fastened on the heat sink enabling a particularly compact and simple attachment. The ring is in particular configured rotationally symmetrical. Its symmetry axis may coincide with the longitudinal axis of the retrofit lamp. The ring has a central opening through which e.g. the at least one semiconductor light source can protrude or emit its light.

For a precise positioning and simple mounting it is an advantageous configuration that the ring is locked with the heat sink. For this purpose, the ring can comprise one or several locking projections which can engage with corresponding locking recesses of the retrofit lamp, especially its heat sink. Alternatively or additionally the ring may comprise one or several locking recesses which can engage with corresponding locking projections of the retrofit lamp, in particular its heat sink.

In a configuration advantageous for a simple production, compact design and precise pressing down, the ring has inwardly directed, elastically flexible or resilient partial sections (without limiting the generality designated as "pressing tabs" in the following) which lie on the front side of the light source module (especially on its circuit board).

By putting on the ring an elastic displacement or bending of the pressing tabs by a defined displacement path is effected. The displacement path may, for example, be between 0.3 mm and 1 mm, in particular about 0.5 mm.

In a configuration advantageous for a precise pressing with a small space requirement on the circuit board of the light source module, the pressing tabs, at their side facing the light source module, comprise at least one projection resting on the front side of the light source module. The projection can, for example, be a bead. The projection is thus directed towards the light source module—in particular its circuit board.

In a configuration advantageous for a uniform pressing, the pressing tabs are uniformly arranged in angle-offset manner in a circumferential direction, in particular in relation to its symmetry axis. The number of pressing tabs is not limited. Advantageously, the ring has three or four pressing tabs, but can also comprise less or more tabs.

In a configuration advantageous for a simple attachment, the ring has a vertical sidewall from which the pressing tabs extend at the upper or front side protruding inwards. In particular, the sidewall can be used for fastening, particularly locking, the ring. This results in the advantage that for its fastening the ring can thus be put or plugged on the heat sink. The sidewall can be closed or open. An open sidewall may comprise a continuous slit and facilitate plugging on the ring. The sidewall may be provided in form of a circular band. Seen in cross section, the pressing tabs may extend from the vertical sidewall at first inclined and then at least approximately horizontally. In plan view, the pressing tabs may have a cake- or sector-like base form.

In a configuration advantageous for a durable elastic characteristic of the ring, the ring consists of fiber reinforced plastics, e.g. of glass-fiber reinforced plastics (GFRP).

In a configuration advantageous for a simple mounting of the lamp, the ring is configured for fastening, in particular locking, at least one optical element. For example, the ring may comprise inwardly directed part sections (without limiting the generality designated as "fastening tabs" in the following) which may be engaged with the optical element.

The fastening tabs may be configured to be engaged with corresponding locking projections of the optical element in a locked manner.

In a further embodiment pressing tabs and fastening tabs can alternate in a circumferential direction of the ring.

The light source module can firmly be pressed onto the heat sink by the ring such that, in one configuration, the light source module is connected to the heat sink without an adhesive. This results in the advantage that no evaporations occur there which might damage the light source module. Material and assembly costs can also be reduced. A liquid adhesive, double-sided adhesive tape, thermal conductive paste etc. can be understood as an adhesive. However, in principle it is possible to provide an adhesive etc. between the light source module and the heat sink. A non-sticky thermal conductive material like a thermal conductive film, a thermal conductive pad etc. may as well be provided between the light source module and the heat sink.

In a further embodiment the ring is configured and arranged as a visual cover, in particular if the bulb consists of a transparent material.

In a further embodiment advantageous for reducing light losses, the ring is reflective, in particular diffuse reflective, on the inside and/or outside. For this purpose, the ring can be provided with a reflective layer, for example of or with titanium oxide.

The object is also achieved by a method for producing a retrofit lamp as described above, wherein the rear side of the circuit board of the light source module is laid on the heat sink and the ring is then put onto the lamp from the front such that it presses the light source module onto the heat sink.

The method can be implemented in analogue to the retrofit lamp and results in the same advantages.

The above-described characteristics, features and advantages of this invention as well as the way in which these will be achieved become more obvious and clearer in connection with the following schematic description of an embodiment which will be explained in more detail in connection with the drawings. Same elements or elements with the same effects may be provided with the same reference numbers for the sake of clarity.

Figure 1:
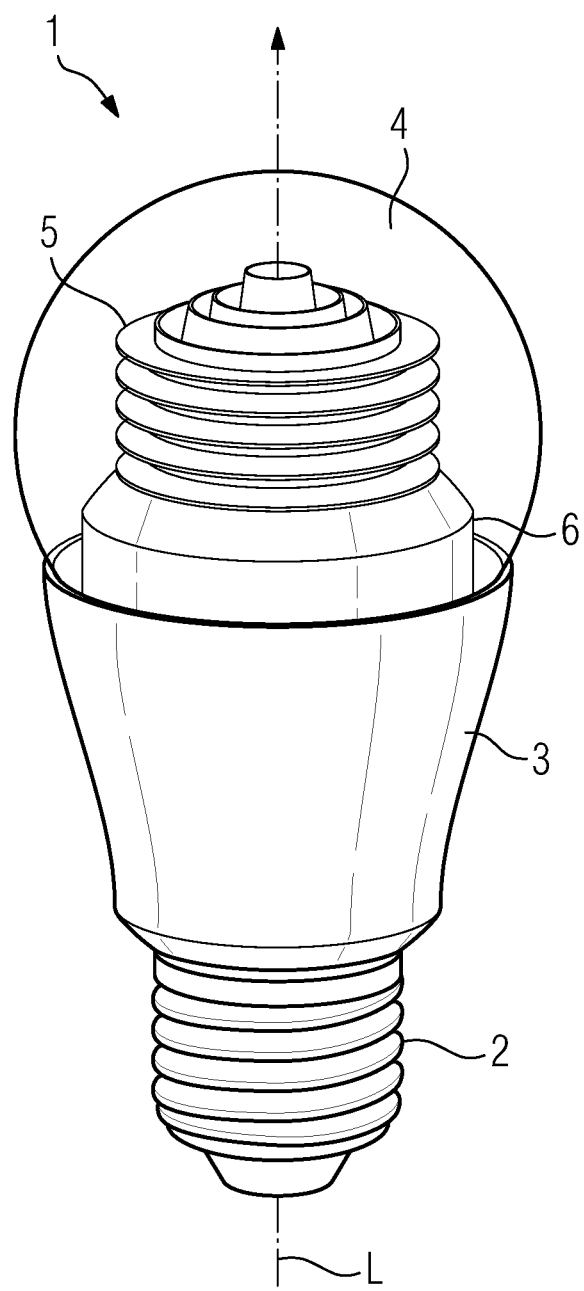
FIG. 1 shows a retrofit lamp for replacing a conventional light bulb in an oblique view.

FIG. 1 shows a retrofit lamp 1 for replacing a conventional light bulb in an oblique view. At its rear end the retrofit lamp 1 with longitudinal axis L comprises an Edison base 2 (e.g. of type E27). A jacket 3, e.g. of plastics, supporting or holding a translucent bulb 4 at the front joins the Edison base 2 in a forward direction. The bulb 4 arches over a translucent optical element ("lens" 5) as well as a ring 6 supporting or holding the lens 5. The bulb 4 can be transparent or diffusely scattering.

Figure 2:
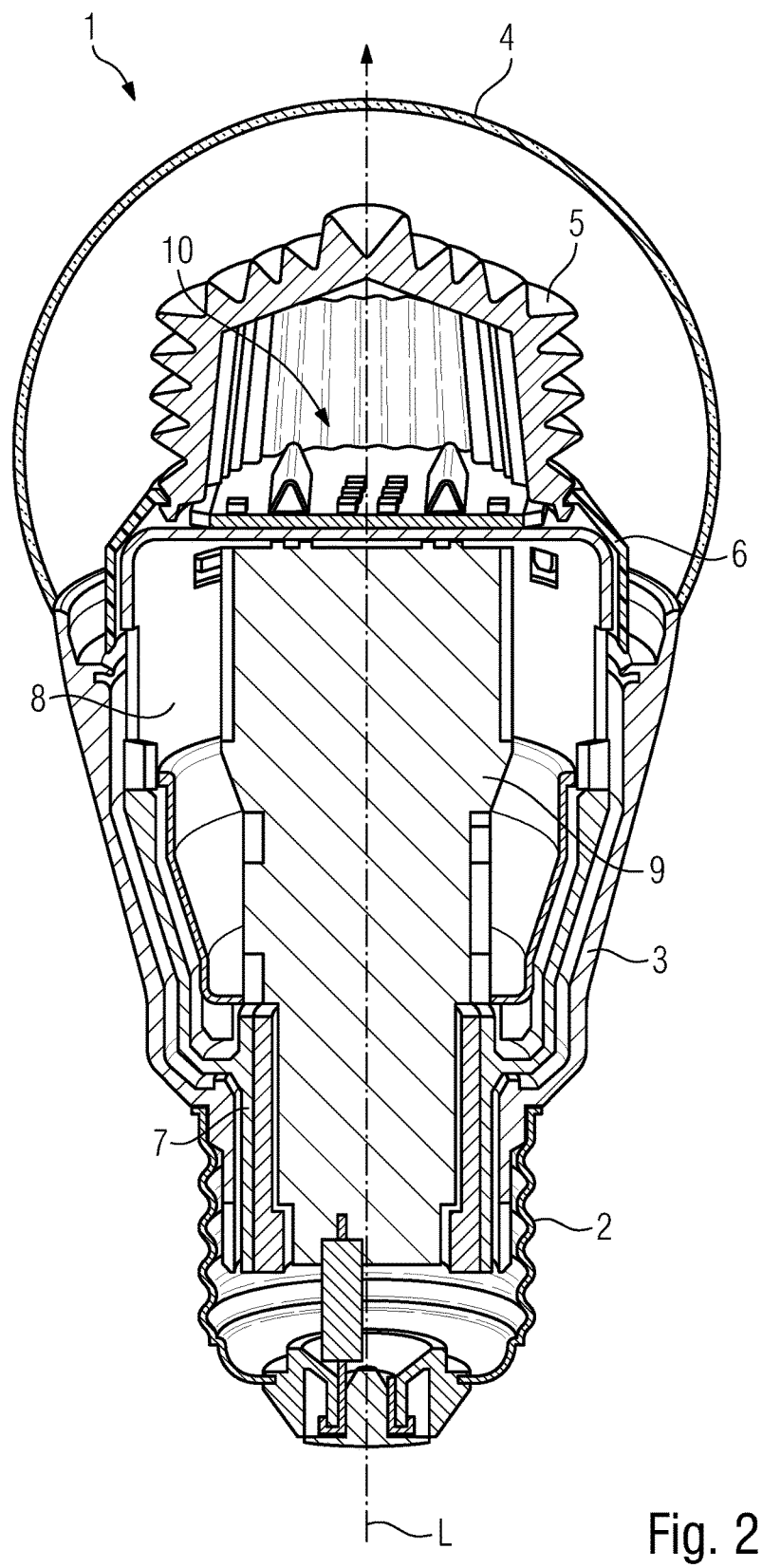
FIG. 2 shows the retrofit lamp in a cross-sectional oblique view.

FIG. 2 shows the retrofit lamp 1 in a cross-sectional oblique view. The jacket 3 laterally surrounds a driver housing 7, 8 in which a driver 9 is accommodated. The driver housing 7, 8 comprises a cup-shaped lower part 7 at base side and a cup-shaped lid at front side serving as a heat sink 8. The lower part 7 may consist of metal or plastics. Here, the heat sink 8 consists of metal, e.g. of aluminum.

A LED module 10 abuts an outside planar contact area of the heat sink 8 oriented forward.

Figure 3:
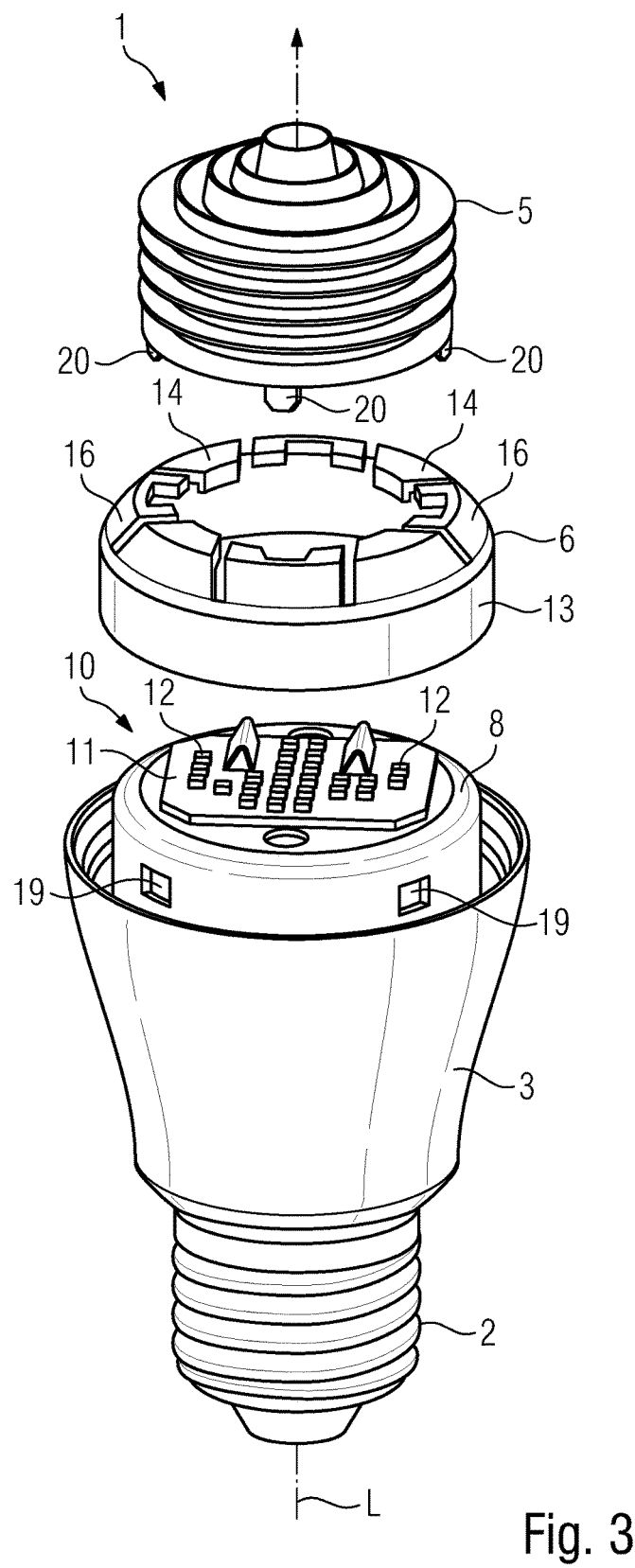
FIG. 3 shows an exploded view of the retrofit lamp without a bulb in an oblique view.

FIG. 3 shows an exploded view of the retrofit lamp 1 without a bulb 4 in an oblique view. The LED module 10 comprises a circuit board 11 which lies two-dimensionally on the heat sink 8 at its rear side and is equipped with several light-emitting diodes (LEDs) 12 at its front side.

Figure 4:
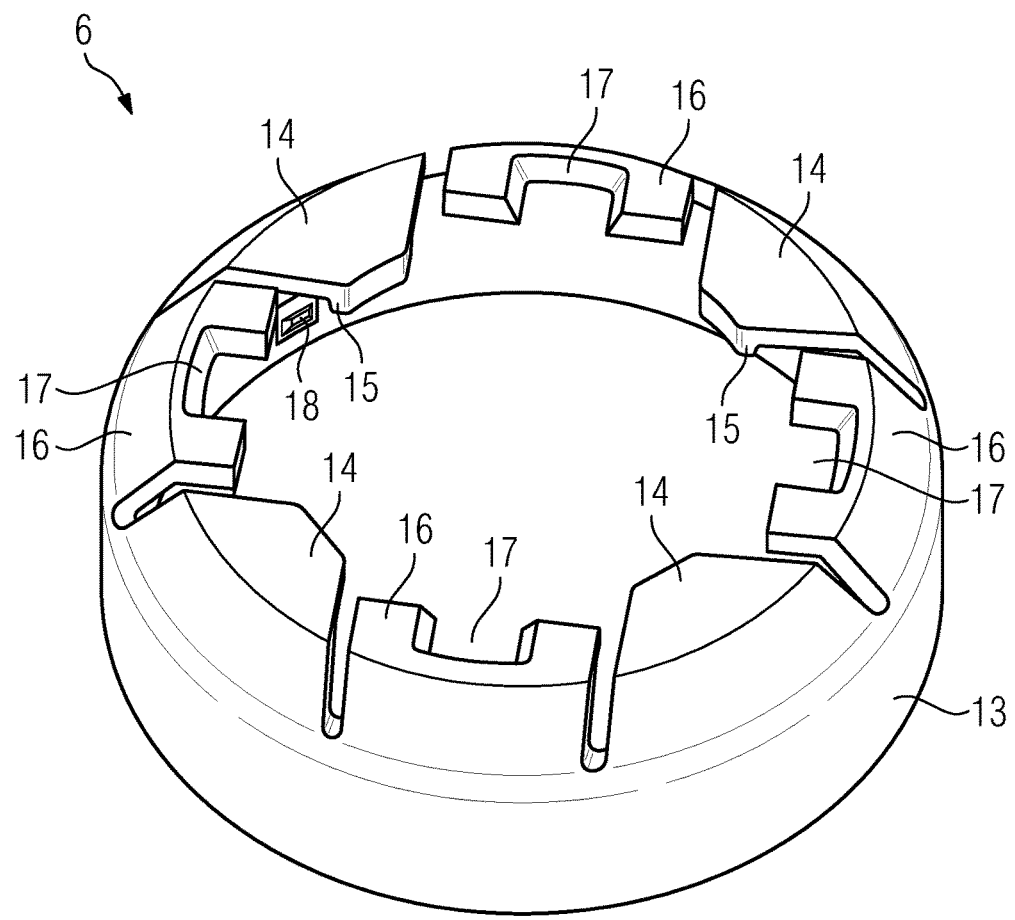
FIG. 4 shows a ring of the retrofit lamp in an oblique view.

The ring 6 shown in FIG. 4 alone in an oblique view comprises a circular ring-shaped vertical sidewall 13 to which four resilient pressing tabs 14 are joined in a forward direction or at the front side (and hence in a main emitting direction of the LEDs 12). Extending from the sidewall 13, the pressing tabs 14 extend firstly inclined and radially inward (towards the longitudinal axis L coinciding with a symmetry axis of the ring 6) and then approximately horizontally (and thus parallel to the circuit board 11) inward. Thus, the pressing tabs 14 protrude inward at the front side. The pressing tabs 14 are uniformly arranged in an 90° angle-offset manner to each other in a circumferential direction about the longitudinal axis L.

The pressing tabs 14 have bulging contact projections 15 at the side facing the LED module 10 or the circuit board 11. The contact projections 15 rest on the front side of the circuit board 11 and press it against the heat sink 8. For this purpose, the pressing tabs 14 are arranged above the circuit board 11 or cover it there. As the LEDs 12 are arranged centrally on the circuit board 11, the pressing tabs 14 press onto the circuit board 11 at the edge.

Furthermore, between the pressing tabs 14 the ring 6 comprises four fastening tabs 16 which also extend firstly inclined inward, extending from the sidewall 13, and then horizontally inward. The pressing tabs 14 and the fastening tabs 16 are alternately arranged in circumferential direction. The fastening tabs 16 comprise no contact projections 15, but rather inside insertion recesses 17.

Furthermore, at the inside of its sidewall 13 the ring 6 comprises several, locking projections 18 distributed in circumferential direction.

Now referring to FIG. 3, at its sidewall the heat sink 8 comprises several locking recesses 19 matching the locking projections 18 of the ring 6 such that the ring 6 is put on the heat sink 8 and can be locked with it by an engagement of the locking projections 18 with the locking recesses 19.

At its rear lower side the lens 5 comprises locking hooks 20 matching the insertion recesses 17 to be fastened at the ring 6 in a locking manner.

Figure 5:
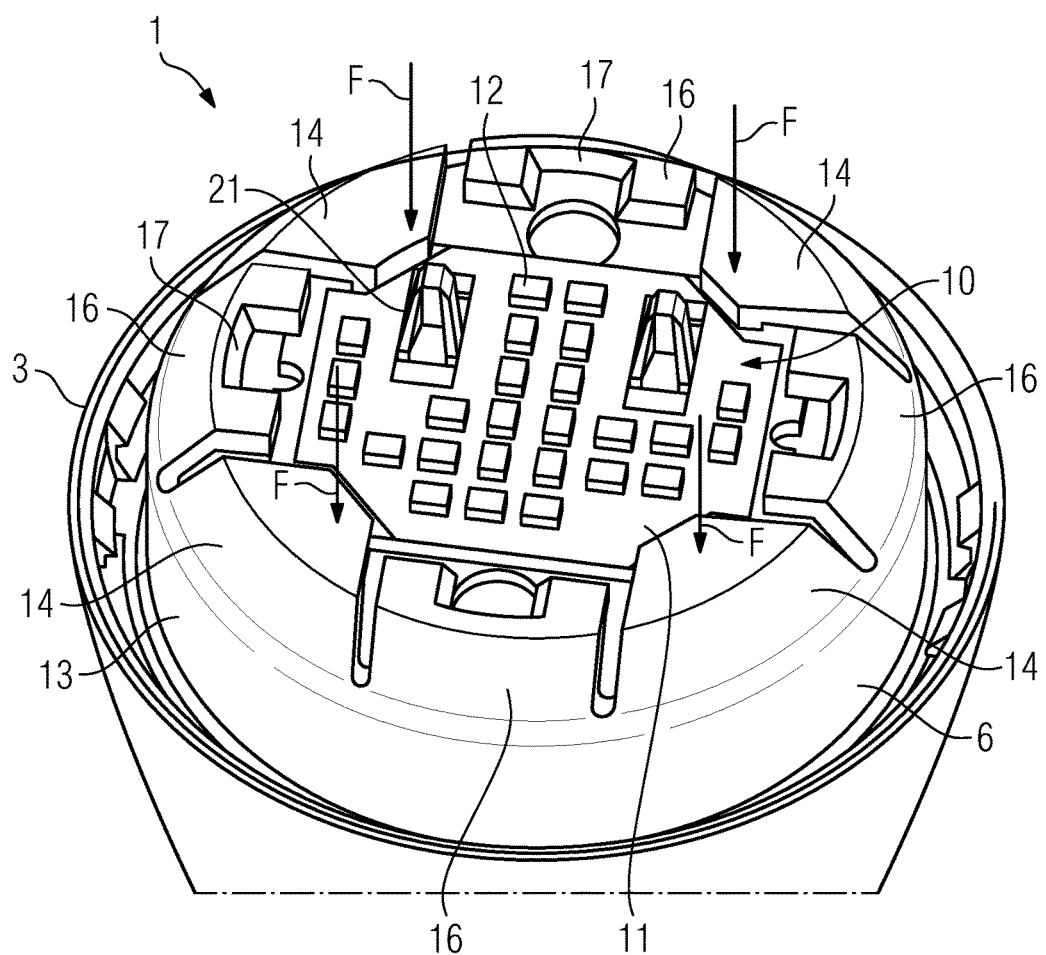
FIG. 5 shows a section of the retrofit lamp without a bulb and without a lens in an assembled state in an oblique view from the front.
Figure 6:
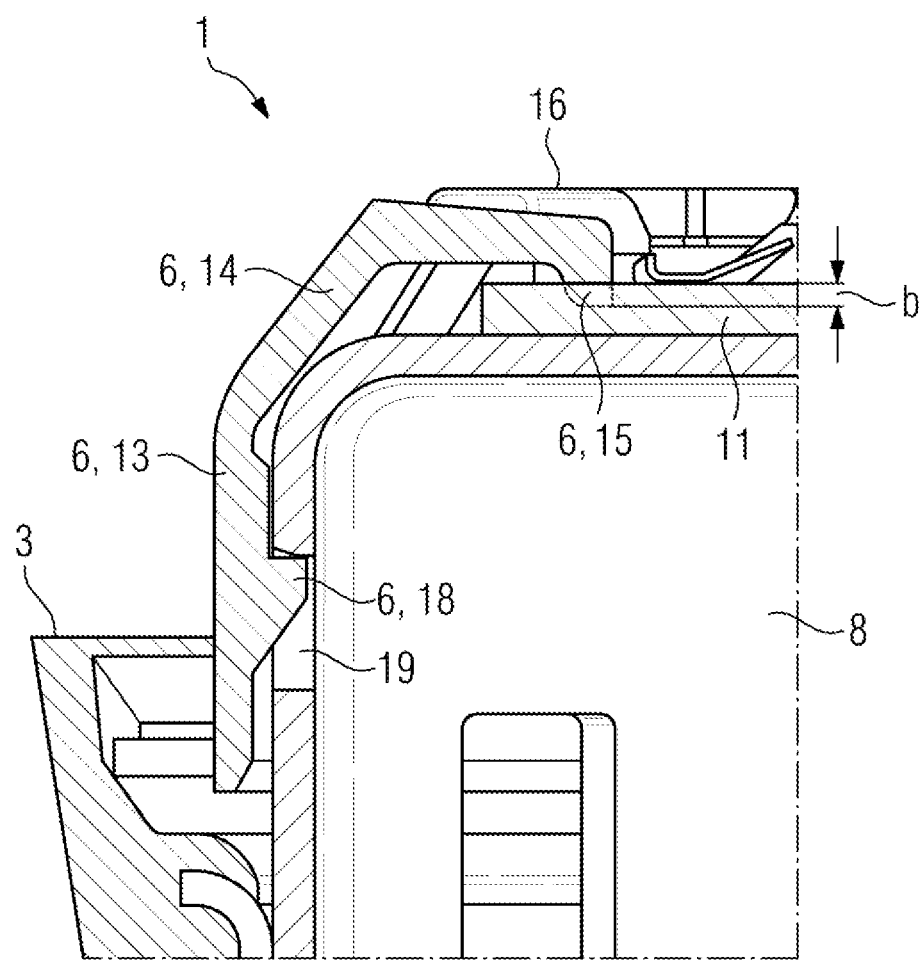
FIG. 6 shows a section of the retrofit lamp without a bulb and without a lens in the region of the ring in a cross-sectional side view.

FIG. 5 shows a section of the retrofit lamp 1 without the bulb 4 and without the lens 5 in an assembled state in an oblique view from the front. With their contact projections the pressing tabs 14 press onto the circuit board 11 because they have been bent away from the circuit board 11 when the ring 6 was put onto the heat sink 8. FIG. 6 shows a section of the retrofit lamp 1 without the bulb 4 and without the lens 5 in the region of the ring 6 in a cross-sectional side view. The pressing tabs 14 are shown in their state where they are not being bent. In order to put them into the bent state, here a displacement b of about 0.5 mm is necessary.

Due to the bending of the pressing tabs 14 an elastic restoring force is generated at each of the pressing tabs 14 which effects a pressing force F (see FIG. 5) onto the circuit board 11 which is well selectable. For being able to generate a sufficiently high elastic restoring force over a long period, the ring 6 here consists of glass-fiber reinforced plastics. Particularly, the pressing force F is so high that the LED module 10 can be connected to the heat sink 8 without an adhesive.

Furthermore, FIG. 5 shows electrical connections 21 between the driver 9 and the LED module 10. The driver 9 can be supplied with electrical energy through the Edison base 2 and transforms the electrical energy into electrical signals for operating the LEDs 12 which can propagate via the electrical connections 21 to the circuit board 11 and then to the LEDs 12.

Although the invention was illustrated and described in detail by the shown embodiment, the invention is not limited thereto, and other variations can be derived therefrom by those skilled in the art without leaving the scope of the invention.

Generally, "a", "an" etc. may be understood as singular or plural, in particular in terms of "at least one" or "one or more" etc., as long as this is not excluded explicitly, e.g. by the term "exactly one" etc.

Numerical data may also include the given number exactly as well as a usual tolerance range as long as this is not excluded explicitly.

REFERENCE NUMERALS retrofit lamp 1
Edison base 2
jacket 3
bulb 4
lens 5
ring 6
lower part of driver housing 7
heat sink 8
driver 9
LED module 10
circuit board 11
light-emitting diodes 12
sidewall of the ring 13
pressing tab 14
contact projection 15
fastening tab 16
insertion recess 17
locking projection nose 18
locking recess 19
locking hook 20
electrical connection 21
displacement b
pressing force F
longitudinal axis L

The invention claimed is:

1. A retrofit lamp comprising:
a heat sink;
a light source module comprising a circuit board, wherein:
a rear side of the light source module lies two-dimensionally on the heat sink; and
at a front side of the light source module, at least one semiconductor light source is arranged; and
a ring partially covering the front side of the light source module, wherein the ring comprises a plurality of elastically flexible pressing tabs arranged at a periphery of the ring and configured to rest on the front side of the light source module and press the light source module onto the heat sink, wherein at least one of the elastically flexible pressing tabs, at a side thereof facing the light source module, comprises at least one projection resting on the front side of the light source module, and wherein the at least one projection extends generally perpendicularly from the at least one of the elastically flexible pressing tabs associated therewith.

2. The retrofit lamp according to claim 1, wherein the ring is locked with the heat sink.

3. The retrofit lamp according to claim 1, wherein at least one of the elastically flexible pressing tabs extends radially inward from the periphery of the ring.

4. The retrofit lamp according to claim 1, wherein the plurality of elastically flexible pressing tabs are uniformly arranged in an angle-offset manner in a circumferential direction around the periphery of the ring.

5. The retrofit lamp according to claim 1, wherein the ring has a vertical sidewall to which the plurality of elastically flexible pressing tabs are joined protruding inwards at a front of the ring.

6. The retrofit lamp according to claim 1, wherein the ring is comprised of a fiber-reinforced plastic.

7. The retrofit lamp according to claim 1, wherein the ring is configured for locking with at least one optical element.

8. The retrofit lamp according to claim 1, wherein the light source module is connected with the heat sink without an adhesive.

9. A method for producing a retrofit lamp according to claim 1, wherein:
 the rear side of the light source module is laid on the heat sink; and
 then the ring is put on the retrofit lamp from a front thereof such that the ring presses the light source module onto the heat sink.

10. The retrofit lamp according to claim 1, wherein at least one of the elastically flexible pressing tabs is bendable in a manner that generates an elastic restoring force that effectuates a pressing force that presses the light source module onto the heat sink.

11. The retrofit lamp according to claim 10, wherein bending of the at least one of the elastically flexible pressing tabs is achieved in physically interfacing the ring with the heat sink.

12. The retrofit lamp according to claim 1, further comprising a plurality of fastening tabs arranged at the periphery of the ring and configured to engage at least one optical element.

13. The retrofit lamp according to claim 12, wherein the plurality of fastening tabs are alternatingly arranged with the plurality of elastically flexible pressing tabs at the periphery of the ring.

14. The retrofit lamp according to claim 12, wherein the plurality of fastening tabs and the plurality of elastically flexible pressing tabs are arranged symmetrically about a central axis of the ring.

15. The retrofit lamp according to claim 1, wherein for at least one of the elastically flexible pressing tabs:
 a first end thereof is configured to interface with the light source module; and
 a second end thereof is configured to interface with the heat sink.

16. The retrofit lamp according to claim 1, wherein the ring is configured to laterally surround the light source module.

17. A retrofit lamp comprising:
 a heat sink;
 a light source module comprising a circuit board, wherein:
  a rear side of the light source module lies two-dimensionally on the heat sink; and
  at a front side of the light source module, at least one semiconductor light source is arranged; and
 a ring partially covering the front side of the light source module, wherein the ring comprises a plurality of elastically flexible pressing tabs arranged at a periphery of the ring and configured to rest on the front side of the light source module and press the light source module onto the heat sink, wherein at least one of the elastically flexible pressing tabs, at a side thereof facing the light source module, comprises at least one projection resting on the front side of the light source module, and wherein the at least one projection is deflectable by a displacement distance in the range of about 0.3-1.0 mm.

18. A retrofit lamp comprising:
 a heat sink;
 a light source module comprising a circuit board, wherein:
  a rear side of the light source module lies two-dimensionally on the heat sink; and
  at a front side of the light source module, at least one semiconductor light source is arranged; and
 a ring partially covering the front side of the light source module, wherein the ring comprises a plurality of elastically flexible pressing tabs arranged at a periphery of the ring and configured to rest on the front side of the light source module and press the light source module onto the heat sink, wherein at least one of the elastically flexible pressing tabs, at a side thereof facing the light source module, comprises at least one projection resting on the front side of the light source module, and wherein the at least one projection is a bead formed from the at least one of the elastically flexible pressing tabs associated therewith.

* * * * *